US008800887B2

(12) United States Patent
Moeller et al.

(10) Patent No.: US 8,800,887 B2
(45) Date of Patent: Aug. 12, 2014

(54) AGRICULTURAL SPRAYER AND METHOD

(75) Inventors: Michael L. Moeller, Grimes, IA (US);
Bradley J. Hitchler, Baxter, IA (US)

(73) Assignee: Deere & Company, Moline, IL (US)

( * ) Notice: Subject to any disclaimer, the term of this patent is extended or adjusted under 35 U.S.C. 154(b) by 152 days.

(21) Appl. No.: 13/071,679

(22) Filed: Mar. 25, 2011

(65) Prior Publication Data

US 2012/0241533 A1 Sep. 27, 2012

(51) Int. Cl.
*B05B 1/20* (2006.01)

(52) U.S. Cl.
USPC .............. 239/159; 239/68; 239/69; 239/70; 239/172; 239/304; 239/307; 239/308; 239/416.3

(58) Field of Classification Search
USPC ........... 239/159–163, 170, 17, 329, 331, 332, 239/303–308, 413–415, 416.1–416.3, 239/417.52, 172, 417.5, 67–70
See application file for complete search history.

(56) References Cited

U.S. PATENT DOCUMENTS 5,433,380 A * 7/1995 Hahn .............................. 239/62

FOREIGN PATENT DOCUMENTS

| EP | 2153710 | 2/2010 |
| FR | 2922725 | 5/2009 |

OTHER PUBLICATIONS

European Search Report received Jul. 13, 2012 (4 pages).

* cited by examiner

*Primary Examiner* — Christopher Kim

(57) ABSTRACT

A system for agricultural spraying including a solution reservoir and primary pump for delivering fluid to a plurality of laterally spaced nozzles interconnected by supply conduits. A chemical reservoir and chemical injection pump are interconnected to the output of the primary pump through a mixer. Controllers for the primary pump and chemical injection pump are coordinated to run the pumps a predetermined time to fill each of the supply conduits from the chemical injection pump and primary pump so as to automatically prime the injection system.

6 Claims, 2 Drawing Sheets

AGRICULTURAL SPRAYER AND METHOD

FIELD OF THE INVENTION

The present invention relates to sprayers, and, more specifically, to sprayers of liquid for agricultural purposes, including chemical additives.

BACKGROUND OF THE INVENTION

Currently, there are numerous systems for adding chemical to a preexisting solution system, which, in turn, is sprayed by a mobile sprayer over an agricultural field. The chemical addition and the solution are selected for particular application of herbicides, insecticides, and the like. With all such systems, it is important to precisely control the amount of solution and chemical only to those sections of the field desired. For this purpose, it is necessary, in existing systems, to manually prime the system. As used herein, the term "prime" does not necessarily refer to the operation of supplying liquid to the inlet of a pump so that it pumps liquid and not air or a mixture of air and liquid. It primarily refers to filling the lines from the respective pumps to the mixer and/or nozzles carried by the agricultural spraying unit.

In current systems, operators rely on experience with the system and/or visual coloring of the chemical to determine when the system is fully primed. When the chemical has no color, the operator must rely on a gut feeling and past experience to operate the pump for a long enough time to prime the line. In addition, the solution lines from the solution pump to the nozzles must be primed and this adds further uncertainty to the system. The uncertainty associated with this procedure creates the potential for wasted chemical, carrier fluid, wasted time, or inefficient application of chemical in the field due to incomplete system priming.

Accordingly, what is needed in the art is a system that automatically primes the conduits so as to enable efficient spraying.

SUMMARY

In one aspect of the invention, a system is provided for spraying liquid for agricultural purposes including an at least one liquid reservoir, a primary or solution pump coupled for drawing liquid from the reservoir, a plurality of laterally spaced nozzle sets, and a supply conduit arrangement including a main supply line connecting the pump to a plurality of supply conduit branches, with each branch incorporating an on/off valve and extending to an associated one of the nozzle sets. The main supply line and the plurality of supply conduit branches have respective internal volumes which are individually calculated. The pump is operable for delivering liquid from the reservoir at a preselected volume rate to the plurality of nozzle sets. A controller is provided for the pump to operate the pump for a predetermined time calculated to be the time required for the pump to fill the internal volume of the supply conduit arrangement when the pump is operating at the preselected volume rate, the controller also operating to automatically respectively close each on/off valve as the elapsed time of operation of the pump equals that calculated for filling the respective conduit branch in which the on/off valve is incorporated.

In another form, the invention is a method for priming a conduit arrangement of a sprayer system for spraying liquid for agricultural purposes with the conduit arrangement of the a system delivering the liquid through a plurality of supply conduit branches respectively to a plurality of laterally spaced sets of nozzles from a main supply line extending from a pump that draws the liquid from a reservoir located at a central location. Each of the supply conduit branches contains an on/off valve, and a check valve is located at each nozzle. The method includes the steps of:

(a) determining the total internal volume of the conduit arrangement including that of the main supply line and each of the plurality of branch conduits;

(b) calculating the time required for the pump to fill the supply conduit arrangement with fluid and the time required for each of the branch conduits to be filled with fluid when operating the pump at a preselected volume flow rate;

(c) operating the pump for supplying fluid at the preselected volume flow rate only for a period of time equal to that required for the total internal volume of the conduit arrangement to be filled; and (d) closing each of the on/off valves during step (c) when the pump has operated for an elapsed time equal to that calculated for filling the branch conduit in which the on/off valve is located.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION

Figure 1:
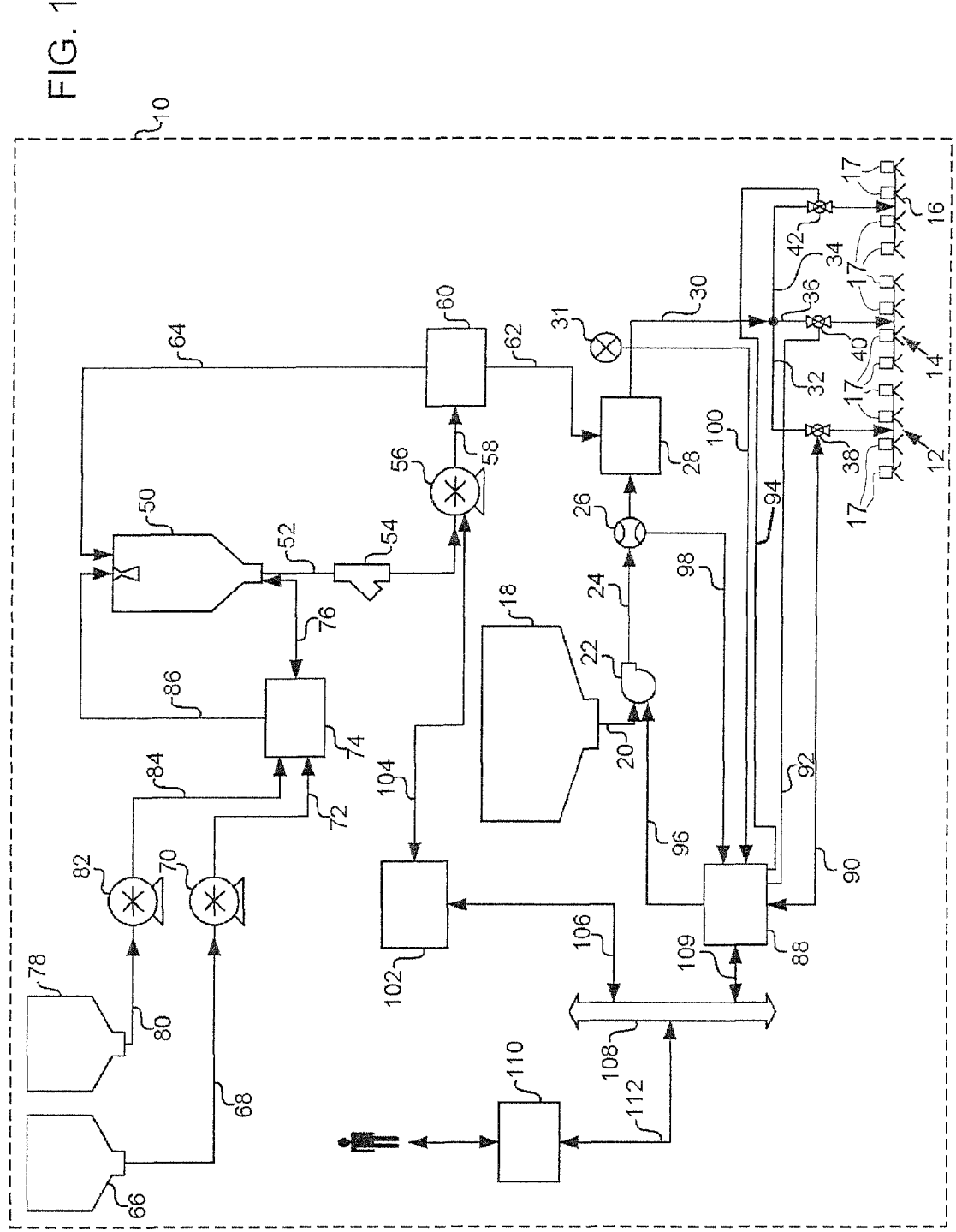
FIG. 1 shows in schematic fashion a system for spraying liquid for agricultural purposes.

Referring now to the drawings, and more particularly to FIG. 1, there is shown in schematic form an agricultural spraying system 10. Only the fluid handling details of agricultural spraying system 10 will be discussed to simplify the understanding of the present invention. However, typical agricultural spraying systems have propulsion systems and other components enabling travel through a field. The system may be mounted on or towed by another vehicle, such as a tractor, or may be a self-propelled unit.

In either case, the system has a plurality of nozzle sets 12, 14, and 16 laterally spaced relative to the direction of motion through a field so as to treat multiple rows. As shown herein, the nozzles in nozzle sets 12, 14, and 16 each have a check valve 17 that permits flow only when the fluid delivered to the nozzle is above a preselected pressure level. Although only three sets of nozzles 12, 14, and 16 have been shown, it should be apparent to those skilled in the art that many more sets may be employed depending upon the width of the treatment area. The nozzle sets 12, 14, and 16 receive liquid solution from a reservoir 18 for application in the field. The solution may be a fertilizer or other component suspended in an aqueous solution. Whatever the properties, the solution passes through an outlet conduit 20 to the inlet of a primary, or solution, pump 22. Solution pump 22 may be appropriately driven by a rotary power source (not shown) to pressurize fluid for delivery through an outlet conduit 24 past a flow meter 26 to a mixer 28. From there, the solution passes through conduit 30, including a pressure sensor 31, to branch conduits 32, 34, and 36 connected in parallel with each other and respectively terminating at the nozzle sets 12, 14 and 16, with the branch conduits respectively incorporating on/off control valves 38, 40, and 42. Thus, it will be appreciated that the conduit 24, passages within the mixer 28 and conduit 30 comprise a main supply line for connecting the primary pump 22 to the branch conduits 32, 34 and 36.

As illustrated, the spraying system 10 mixes a chemical with the solution flow and, for this purpose, a chemical reservoir 50 is provided and has an outlet conduit 52 in which a strainer 54 is interposed and connects with the inlet of a chemical injection pump 56, herein illustrated as a positive displacement pump so that flow is directly proportional to pump rpm. The output from chemical injection pump 56 passes through conduit 58 past an injection system valve 60 and through a conduit 62 to the mixer 28. A conduit 64 provides a recirculation flow of chemical back to reservoir 50 from valve 60.

In typical fashion, the reservoir 50 is provided with chemical from a shuttle tank 66 feeding an outlet conduit 68 by gravity to a chemical transfer pump 70, which delivers chemical through an outlet conduit 72 to a control valve 74, passing chemical into the bottom of reservoir 50 through conduit 76. Valve 74 functions as a fill and drain valve as appropriate by a suitable control function.

In addition, the chemical reservoir 50 is provided with a rinse function from a rinse solution reservoir 78 feeding an outlet conduit 80 through a rinse pump 82 delivering rinse fluid to conduit 84, which, in turn, passes to the multifunction valve 74 controlling the rinse/drain/fill function and ultimately to conduit 86 providing rinse fluid to the top of reservoir 50. Details of this operation are not discussed in order to simplify the understanding of the present invention.

A controller 88 is provided for controlling the operation of valves 38, 40, and 42 through control interconnections 90, 92, and 94 respectively. Thus, the valves 38, 40, and 42 are opened or closed as necessary to provide spray through the various nozzle sets 12, 14, and 16. The controller 88 also controls the operation of the primary pump 22 through line 96. Primary pump 22 is typically a centrifugal pump requiring a variation in rpm to achieve a given volume flow rate. For this purpose, controller 88 receives signal inputs from the flow meter 26 via line 98 to vary the rpm and thus the volume flow rate. The pressure sensor 31, via line 100 provides an indication to the operator of the system operating pressure.

The chemical injection pump 56 is controlled by a similar controller 102 via line 104 to provide appropriate operations and flow rates as needed.

Heretofore, agricultural spraying systems have required manual priming, which carries with it the uncertainty and variation that have been discussed above. In accordance with the present invention, the controllers 88 and 102 are coordinated in such a way that the priming operation is automated. For this purpose, an interconnection between the controllers 102 and 88 is provided by a control line 106 to a bus 108 and through to controller 88 via control line 109. A signal line 112 extends from the bus 108 to an operator input and feedback device 110 through which an operator can control the input of information to the controllers 88 and 102, the device 110 acting to display feedback information. An interconnection between the controllers enables sequential operation as described below.

The method of operating the system for automatic priming includes determining the internal volume of conduits 58 and 62, which are associated with the chemical injection pump 56. In addition, the total internal volume of the supply conduit arrangement defined by the outlet conduit 24, flow passages within mixer 28, conduit 30, and branch conduits 32, 36, and 34 is also determined. From the preselected flow rate of the injection pump 56 and the determined internal volumes of the conduits 58 and 62 coupled for routing fluid to the mixer 28, it can be calculated how long the injection pump 56 needs to be operated for filling the conduits 58 and 62, the pump 56 being operated only for this period of time during priming operation. Similarly, from the preselected volume flow rate of the solution pump 22 and the internal volume determined for each part of the supply conduit arrangement respectively defined by the outlet conduit 24, flow passages within mixer 28, conduit 30 and branch conduits 32, 36, and 34, a time to fill the respective conduits is determined, enabling a calculation of the time it takes to fully fill and prime the respective conduits located between the pump 22 and the nozzle sets 12, 14, and 16.

Figure 2:
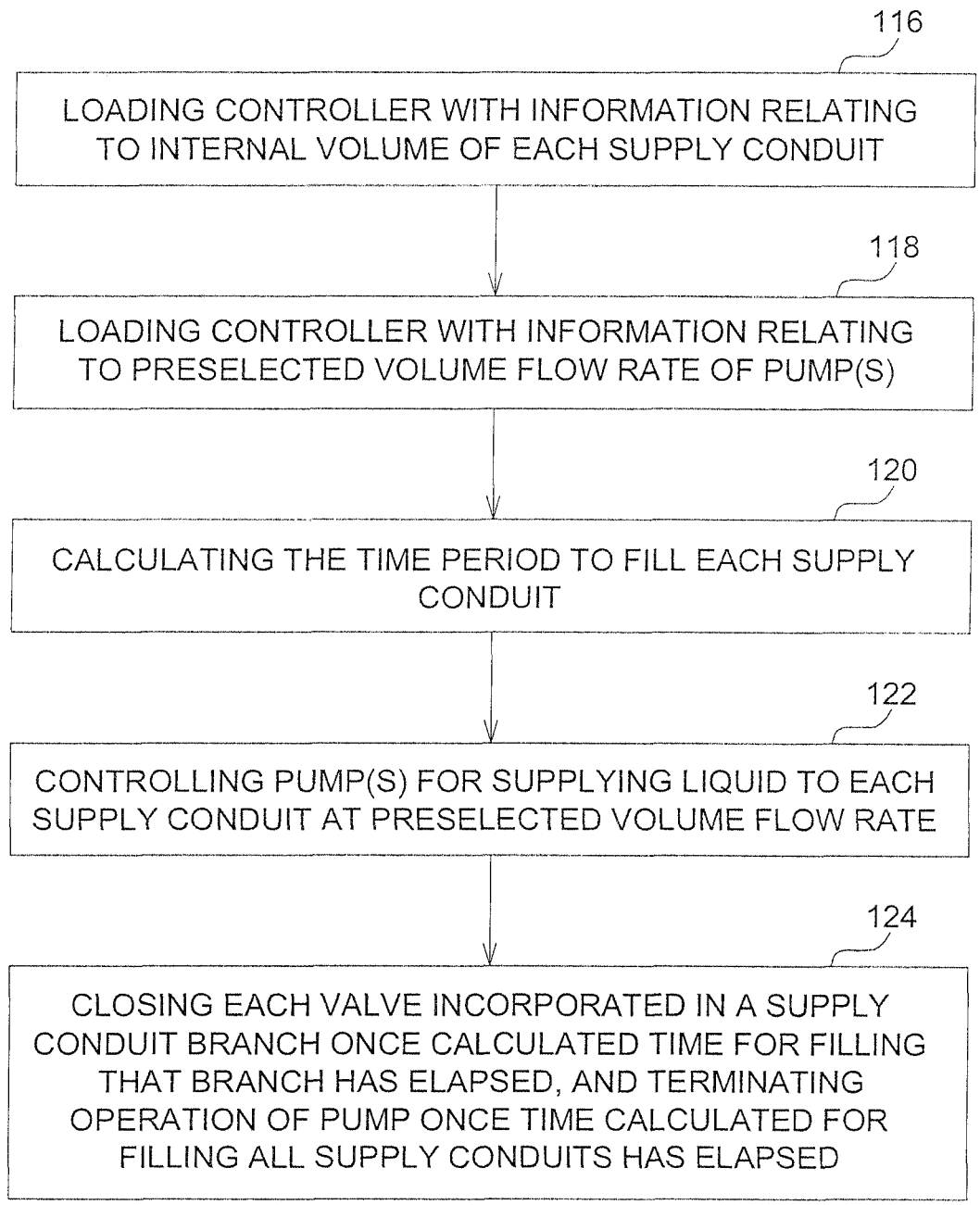
FIG. 2 illustrates the steps used in practicing the present invention.

The method is illustrated in FIG. 2 in which step 116 constitutes loading the controller with information concerning the internal volume of each of the supply conduits 58, 62, 24, 30, 32, 36 and 34. In step 118, the liquid application volume rate for the respective pumps is preselected and the controller is provided with this information and, in step 120, the time period to fill each supply conduit based on the volume and volume flow rate is calculated. In step 122, the pump is controlled for delivering liquid to each supply conduit at the preselected volume flow rate, and in step 124, each on/off valve incorporated in the branch conduits 32, 36 and 34 is automatically closed by the controller once the time calculated for filling that branch has elapsed, and the operation of the pump is automatically terminated by the controller once the time calculated for filling all of the supply conduits has elapsed, with the supply conduits then being full and primed.

In the normal operation of the spray system 10, the chemical injection pump 56 is operated for a period of time that takes into account the internal volume of the conduits 58 and 62 and the flow rate through pump 56. When the time period has elapsed, the controller 102 terminates operation of the pump 56. At this point, the primary pump 22 is operated for the period of time calculated to fill conduit 24, internal passages of mixer 28, conduit 30, and branch conduits 32, 36 and 34. As apparent from FIG. 1, branch conduits 32 and 34 have a greater internal volume because of their length relative to that of the central branch conduit 36. While the primary pump 22 is operated for the period of time calculated as being necessary to fill the internal passages of the mixer and all of the conduits 30, 32, 34 and 36, the valve 40 is automatically closed by operation of the controller 88 when the elapsed time equals that required for filling the shorter branch conduit 36. The primary pump 22 continues to operate for an additional period of time required to fill branch conduits 32 and 34, at which point the controller 88 acts to automatically close the valves 38 and 42. Once the primary pump 22 has operated for the period of time calculated for being necessary to fill the internal passages of the mixer 28, conduit 30 and all of the branch conduits 32, 34 and 36, the controller 88 sends a first signal, via the control line 96 for terminating operation of the primary pump 22, and sends a second signal via the control line 109, bus 108 and signal line 112 to the operator input and feedback device 110, which generates a signal for notifying the operator to that the system is fully primed and operational for spraying a desired agricultural liquid via the spray nozzle sets 12, 14 and 16. It should be noted that, because of the coordination between controllers 88 and 102, the system can be fully automated so that the operator may individually prime the circuits or do so in an automated sequence. It should be noted that the present invention, while illustrated with a chemical injection pump, may be employed in a system having only a solution reservoir and a primary pump. In that case, the same principles apply and the valves 38, 40, and 42 may be automatically respectively closed, as described above, in response to the elapsed time of operation of the pump 22 equaling that calculated as necessary for filling the conduit branch with which the respective valve is associated.

The advantage of the above system is that it enables a fully automated priming operation with a minimum of spillage on the ground, noting that the check valve 17 associated with each of the nozzles of a respective nozzle set prevents leakage from the nozzle when the associated one of the valves 38, 40 and 42 is closed or when the pressure at the nozzle is below the preselected value for opening the check valve. This also reduces the amount of liquid used to prime because it is a calculated value instead of one based on gut feel or experience. In addition, the closing of the valves supplying the nozzle sets or arrays minimizes the amount of liquid that is used for the priming and accordingly, minimizes the time it takes to prime the unit. Spraying systems typically require flushing the supply conduit arrangement of the system coupled to the nozzles with water, which may remain in the system upstream of the nozzles so that while the various supply conduits may be full, they still need to be primed with the selected solution and chemical. Thus, by operating the pump 56 for the period of time calculated for filling the supply conduits 58 and 62, and by operating the pump 22 for the period of time calculated for filling the supply conduits 24, 30, 32, 34 and 36, the selected solution and chemical will act to replace the water by forcing the water out the check valves 17 and nozzles once the pressure threshold of the check valves is reached.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A system for spraying liquid for agricultural purposes comprising:
at least one liquid supply reservoir having an outlet conduit;
a main supply conduit having a known internal volume;
a plurality of laterally spaced nozzle sets;
a plurality of supply branch conduits connected in parallel to each other to the main supply conduit and respectively connected to said plurality of laterally spaced nozzle sets, with each of said supply conduit branches having a known internal volume;
a plurality of on/off valves respectively incorporated in said plurality of supply conduit branches;
a primary pump coupled for receiving liquid from said outlet conduit of said liquid supply reservoir and for delivering fluid to said main supply conduit;
a controller connected for controlling said primary pump for causing said primary pump to deliver liquid at a preselected volume flow rate set by an operator and with the controller further being connected for respectively controlling said plurality of on/off valves so as to close each on/off valve in response to an elapse of time equal to that calculated for the primary pump, when operating at said preselected volume flow rate, to fill the known internal volume of the supply conduit branch in which the on/off valve is incorporated, and with at least one of said supply conduit branches having an internal volume greater than at least another one of said supply conduit branches, whereby the controller will act to close the on/off valve associated with the at least one supply conduit branch prior to closing the on/off valve associated with the at least another one of the supply conduit branches, and the controller further being operable for terminating operation of said pump in response to the pump operating for an elapsed time equal to the time calculated for the pump to fill the combined known volumes of the main supply conduit and the plurality of conduit branches; and
an operator control unit being coupled to said controller for setting said preselected volume flow rate and for providing information including the known internal volumes respectively of said main supply conduit and each of said plurality of branch conduits.

2. The system of claim 1, further comprising:
a chemical reservoir;
a chemical injection pump having a flow inlet and a flow outlet, with the flow inlet being coupled to said chemical reservoir;
a supply conduit arrangement having first and second ends with the first end being coupled to said chemical injection pump flow outlet;
a mixer coupled to said second end of said supply conduit arrangement for receiving flow from said chemical injection pump and, the mixer forming part of said main supply conduit and thus being coupled for receiving flow from said primary pump and mixing it with the flow from said chemical injection pump; and,
a second controller coupled to said operator control unit for receiving information relating to the internal volume of said supply conduit arrangement and for receiving information relating to a preselected output volume flow rate of said chemical injection pump, said second controller also being connected to said chemical injection pump for selectively operating said chemical injection pump for delivering liquid at said preselected volume flow rate only for a time sufficient for filling said supply conduit arrangement prior to the filling of said main supply conduit and said plurality of supply conduit branches for priming the entire system.

3. The system of claim 2, wherein said chemical injection pump is a positive displacement pump.

4. The system of claim 2, further comprising a rinse pump connected to a supply of rinse liquid, the second controller also being connected to said rinse pump for controlling said rinse pump to rinse said chemical supply reservoir.

5. The system of claim 1, further comprising a flow meter mounted for receiving and measuring the flow from said primary pump, said flow meter generating a flow output signal which is connected to said controller for being used to control the volume flow rate of said primary pump so as to attain said preselected volume flow rate.

6. The system of claim 5, wherein said primary pump has a pressure output and said system further comprises a pressure sensor sensing the pressure output from said primary pump and said pressure sensor generating the pressure signal which is connected to said controller.

* * * * *